United States Patent [19]

Sagady

[11] Patent Number: 4,514,108
[45] Date of Patent: Apr. 30, 1985

[54] RETENTION RING FOR SPLINED JOINT

[75] Inventor: Daniel V. Sagady, Oxford, Mich.

[73] Assignee: Ford Motor Company, Dearborn, Mich.

[21] Appl. No.: 447,743

[22] Filed: Dec. 8, 1982

[51] Int. Cl.³ .............................................. F16D 1/10
[52] U.S. Cl. .................................. 403/359; 403/319; 411/321
[58] Field of Search ............... 403/359, 356, 357, 261, 403/155, 319; 411/217, 109, 110, 221, 321, 323; 285/114, 197, 420

[56] References Cited

U.S. PATENT DOCUMENTS

| 874,378 | 12/1907 | Allen | 285/114 |
|---|---|---|---|
| 1,645,342 | 10/1927 | Moorhouse | 403/357 X |
| 3,388,934 | 6/1968 | Chapman et al. | 403/357 |
| 3,469,864 | 9/1969 | Guerrero | 285/420 X |
| 3,527,483 | 9/1970 | Dashner | 285/197 |
| 3,561,799 | 2/1971 | Hutchinson | 411/516 X |
| 3,832,076 | 8/1974 | Gehrke | 403/359 |

FOREIGN PATENT DOCUMENTS

| 2256750 | 9/1973 | Fed. Rep. of Germany | 403/356 |
|---|---|---|---|
| 436933 | 4/1975 | U.S.S.R. | 403/356 |

Primary Examiner—Richard J. Scanlan, Jr.
Attorney, Agent, or Firm—Frank G. McKenzie; Donald J. Harrington

[57] ABSTRACT

A clip for securing inner and outer members of the splined joint against relative axial movement includes a first resiliently supported ear nested within a recess formed on the splined surface of the inner member and contacting an end face of the outer member. A second ear at the opposite axial end of the joint engages an end face of the outer member and is connected by way of an axially directed arm to the first ear. In a second embodiment a third ear coplanar with the first ear engages another arcuate portion of the groove and is connected by a second axial arm with the second ear. Provision is made in the outer member for the arms to extend axially along the joint. The clip is preferably made from a single length of steel wire.

14 Claims, 9 Drawing Figures

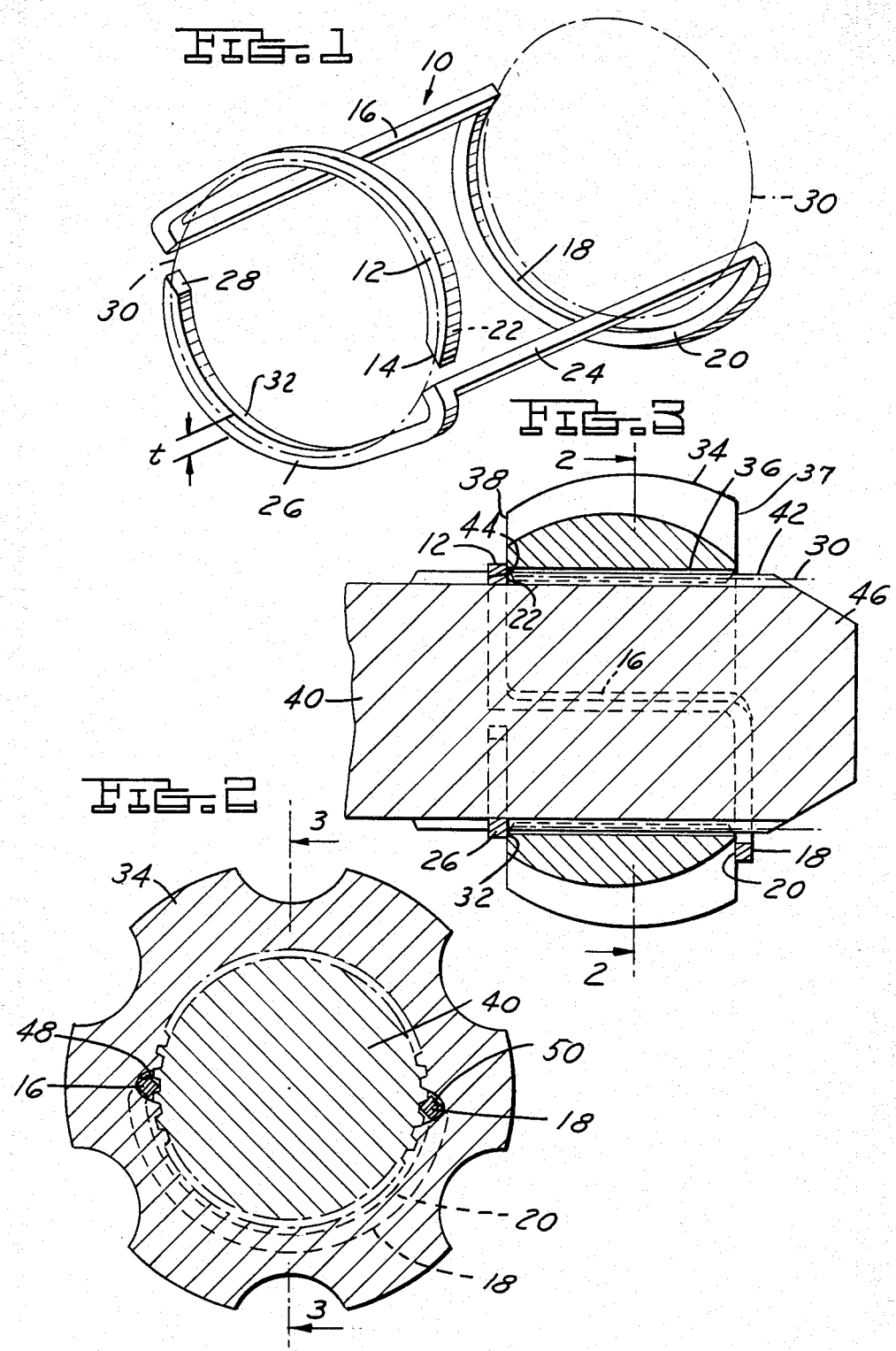

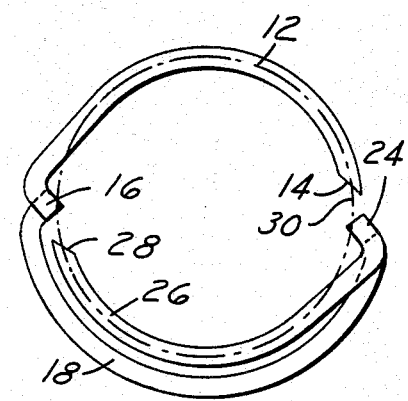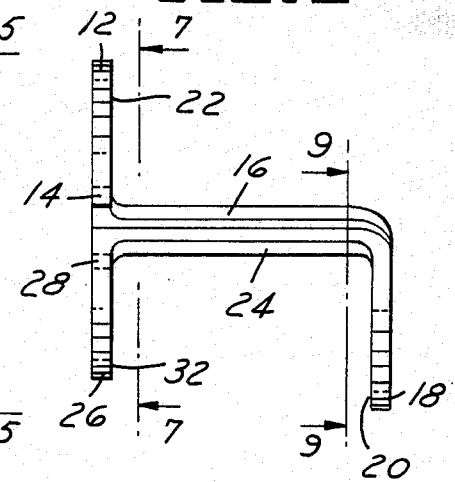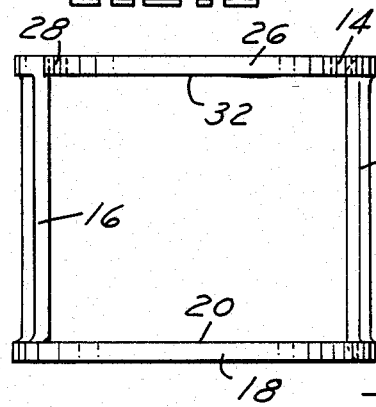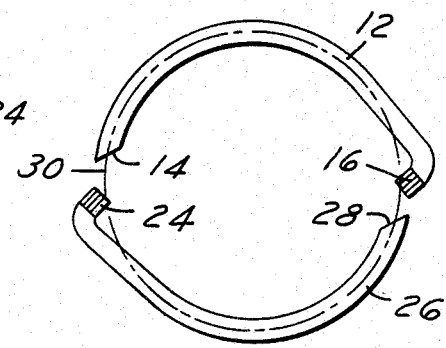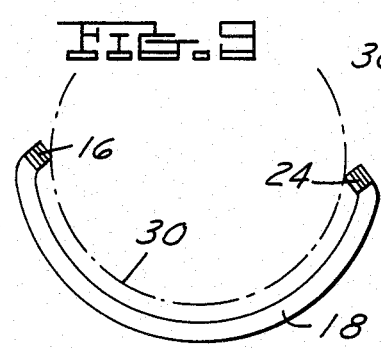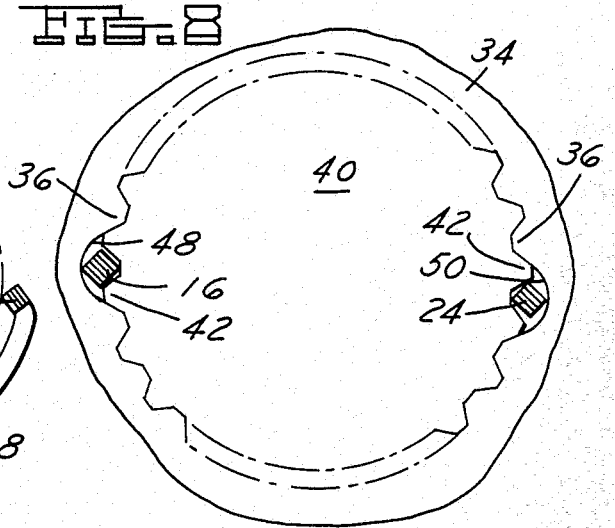

RETENTION RING FOR SPLINED JOINT

BACKGROUND OF THE INVENTION

1. Field of the Invention

This invention relates to mechanical joints for transmitting torque, and more particularly pertains to assembling and retaining the components of such joints in correct operating position.

2. Description of the Prior Art

Connections made between the various components of a driveline through which power in the form of torque is transmitted typically employ splined connections between the mating members. In such joints straight, axially directed spline teeth are formed on the exterior surface of an inner member and mating spline teeth are formed on an inner surface of an outer member. Torque is transmitted by bearing contact between the teeth in a circumferential direction. In order to retain the members in correct position in an axial direction, generally the inner member has two circumferentially directed grooves formed on the splines at opposite axial ends of the outer member. After the outer member is fitted over the inner member, circlips are expanded and snapped into position in the grooves provided to retain them. A radial planar surface of one circlip contacts an adjacent planar surface of the outer member at one side of the joint and a similar surface of the other circlip contacts a surface of the inner member at the opposite side. In this way the outer member is retained in position between the surfaces of the circlip and axial movement relative to the inner member is prevented.

Often drive connections of this type must be made where one side is inaccessible or can be reached only with great difficulty from one end of the joint member. Where circlips are used to retain the members in position, complete inaccessibility must be avoided because the circlips are installed from both sides of the joint. It would be preferable if some means were provided that would permit splined joints of this type to be retained in correct position without the need to apply circlips from both axial ends of the joint. If this were done, such splined connections could be made from one end thereby saving some time in the installation. Also connections that are completely inaccessible from one side of the joint can be made in splined joints of this type.

SUMMARY OF THE INVENTION

A retaining clip, that can be made integrally in one piece from a single length of steel wire having a rectangular cross section, has ears located at opposite axial ends of the joint connected by arms that extend between the ears. The clip is installed within the inner surface of the outer member before the joint is assembled such that the axially extending arms are located angularly within recesses formed in the outer member to receive them. The arms provide a radially resilient support for the ears and permit the ears to be displaced radially in both directions. In the process of installing the clip, the ear that is inserted within the outer member is displaced radially inward and forced through the splined bore until it clears the outer member. It then springs radially outward into contact with the surface of the outer member. Next, the inner member having a chamfered lead surface at its end is moved within the annular space defined by the ears at one end of the clip, the chamfered surface operating to displace the ears radially outward thereby permitting the teeth of the inner member to clear the clip and to engage the splined teeth of the outer member. The inner member is moved axially through the outer member until a circumferentially directed groove becomes aligned with the ear. When these parts become aligned, the ear springs radially inward into the groove.

The installation is made from one axial end of the joint and provides axial retention of the joint members in much the same way as a circlip installation. The clip is readily removed by prying radially outward the ear from engagement within the circumferential groove and, while being so displaced, withdrawing the inner member from the bore of the outer member.

BRIEF DESCRIPTION OF THE DRAWINGS

FIG. 1 is an isometric view of a retention ring made according to this invention.

FIG. 2 is a cross section taken at transverse plane 2—2 of FIG. 3.

FIG. 3 is a cross section taken at longitudinal plane 3—3 of FIG. 2 showing an assembled splined joint in which the retention ring is fitted.

FIG. 4 is a top view of the retention ring.

FIG. 5 is a side elevation view of the retention ring of FIG. 4.

FIG. 6 is a front elevation view of the retention ring of FIG. 4.

FIG. 7 is a cross section viewed in direction 7—7 of FIG. 5.

FIG. 8 is a partial end view of the outer face of the outer joint member showing a recess that receives a portion of the retainer ring. FIG. 9 is a cross section taken at plane 9—9 of FIG. 5.

DESCRIPTION OF THE PREFERRED EMBODIMENT

Referring first to FIG. 1, a clip for retaining members of a splined joint in a predetermined axial position has a first ear 12 extending over an angular portion of an arc having a free end 14 formed with a bevel surface and another end connected to an axially extending arm 16. At the opposite end of arm 16, a second ear 18 also extending over an angular portion of an arc is spaced axially by the length of arm 16 from ear 12. Each of the ears has an inner surface 20, 22 facing the corresponding surface on the other ear. The clip 10 has a second arm 24 parallel to arm 16 connecting second ear 20 to a third ear 26 which extends over an angular portion of an arc and has a free end 28 formed with a bevel surface. Ears 12 and 26 are generally in a common plane and have a radial thickness dimension which straddles the circumference of an outline 30 of the pitch circle circumscribed by splines 42 of shaft 40. When circle outline 30 is repeated at the axially opposite end of clip 10 it can be seen that the arc over which ear 20 extends is larger in size than that of ears 12 and 26.

A splined joint whose members are retained in position so that relative axial displacement between them is prevented is shown in FIGS. 2 and 3. There an outer member 34, which in this example is the inner race of a constant velocity universal joint, has an axial bore in which axially directed splined teeth are formed. Opposite axial ends of outer member 34 are formed with faces 37, 38 adapted to be contacted by the inner surfaces 20, 22, 32 of the ears.

The inner joint member 40 has an outer surface on which axially extending splined teeth 42 meshing with teeth 36 of the outer member are formed. A groove 44 extending circumferentially about the outer surface of inner member 40 and located adjacent an axial end of its splined surface extends radially inward past the circumference of pitch diameter 30, which represents the pitch diameter at which teeth 42 and 36 mesh. The inner member has a chamfered or beveled surface 46 formed on its end opposite the location of groove 44. FIG. 2 shows the axially directed grooves 48, 50 made in the outer joint member which are located angularly about the axis of the joint so that arms 16 and 24 can be fitted within the space they provide.

Clip 10 can be formed from a single length of SAE 1064 spring wire or rod approximately 1.6 mm square having a hardness of RC 45–50.

The joint is assembled by first deflecting ears 12, 26 radially inward so that they fit within the splined surface on the interior of the outer member 34, the clip being inserted within member 34 from the end face 37. The clip is moved axially through member 34 until ears 12, 26 clear the splined surface at which point they will move resiliently radially outward into contact with end face 38. The clip is sized such that surface 20 of ear 18 contacts end face 37 of the outer member. The clip should be so aligned angularly that arms 16 and 24 are fitted within the axially directed grooves 48, 50 provided to receive them. Next, the end of the inner member having the chamfered surface 46 is inserted within the outer member 34 in the direction from end face 38 toward face 37. During the insertion process, chamfered surface 46 contacts the radially inner surfaces of ears 12 and 26, forcing the ears radially outward and onto the outer surface of teeth 42 of the inner member. The teeth of the splines are brought into mesh and the inner member is moved axially through the outer member until ears 12 and 26 resiliently return into engagement with recess 44. The clip is removed by inserting a prying tool, such as a screw driver, into the space between ears 12 and 26 and into contact with the bevel surfaces 14 and 28. By lifting radially outward the ears can be removed from groove 44 and while in this position the inner member is withdrawn from the outer member 34.

Having described a preferred embodiment of my invention, what I claim and desire to secure by U.S. Letters Patent is:

1. A splined joint for transmitting torque between connected members comprising:
    an inner member having axially directed spline teeth formed on its outer surface and a groove formed near an axial end of the spline teeth;
    an outer member having axially directed spline teeth meshing along their length with the spline teeth of the inner member;
    a clip having a first arcuate ear located within the groove of the inner member and abutting an adjacent surface of the outer member, a second arcuate ear spaced axially from the first ear and abutting an adjacent surface of the outer member at the axially opposite side from that at which the groove is located, and an axially extending arm connecting the first and second ears preventing relative axial displacement of the first and second ears; and
    means providing a space within which the arm of the clip is located.

2. The joint of claim 1 wherein the arm of the clip provides a radially resilient connection between the first and second ears.

3. The joint of claim 1 wherein the clip further includes a third arcuate ear located within the groove of the inner member and abutting an adjacent surface of the outer member;
    a second axially extending arm connecting the second and third ears preventing relative axial displacement of the second and third ears; and
    means providing a space within which the second arm is located.

4. The joint of claim 1 wherein the clip is formed from a single length of wire.

5. The joint of claim 3 wherein the clip is formed from a single length of wire.

6. The joint of claim 1 wherein an axially directed space is provided within which the arm of the clip is located.

7. The joint of claim 3 wherein axially directed spaces are provided within which the arms of the clip are located.

8. The joint of claim 2 wherein the inner member has means for displacing the first ear radially outward as the inner member is inserted within the outer member and the radially resilient connection permits the first ear to move radially inward into the groove of the inner member.

9. The joint of claim 3 wherein the first and third ears each have at least one free end spaced angularly from the other ear whereby the ears may be displaced radially outward from engagement with the groove and while so displaced the inner and outer members may be disconnected.

10. A clip for preventing relative axial displacement between an outer member and an inner member fitted within the outer member comprising:
    a first arcuate ear seated within a recess on the inner member, having a surface abutting a first end face of the outer member, said first ear preventing relative movement in one axial direction between the inner member and the outer member due to contact at the recess and at the first end face;
    a second arcuate ear located axially opposite the first arcuate ear, having a surface abutting a second end face of the outer member located axially opposite the first end face; and
    an axially directed arm connecting the first and second ears defining the axial distance between said surfaces of the first and second ears;
    said clip preventing relative movement in the other axial direction between the inner member and the outer member due to contact between the first ear and the recess and due to contact between the second ear and the second end face of the outer member.

11. The clip of claim 10 further comprising:
    a third arcuate ear seated within the recess on the inner member, having a surface abutting the first end face of the outer member, said third ear preventing relative movement in one axial direction between the inner member and the outer member due to contact at the recess and at the first end face; and
    a second axially directed arm connecting the second and third ears defining the axial distance between said surfaces of the second and third ears.

12. The clip of claim 10 wherein the arm provides a radially resilient connection between the first and second ears.

13. The clip of claim 10 wherein the clip is formed from a single length of wire.

14. The clip of claim 11 wherein the clip is formed from a single length of wire.

* * * * *